United States Patent [19]

Burgess et al.

[11] 3,911,553

[45] Oct. 14, 1975

[54] METHOD FOR BONDING METAL TO CERAMIC

[75] Inventors: James F. Burgess; Constantine A. Neugebauer, both of Schenectady, N.Y.

[73] Assignee: General Electric Company, Schenectady, N.Y.

[22] Filed: Mar. 4, 1974

[21] Appl. No.: 447,890

[52] U.S. Cl. .................. 228/173; 228/195; 228/903
[51] Int. Cl.$^{2}$.......................................... B23K 31/02
[58] Field of Search ........ 29/472.9, 482, 471.9, 628

[56] References Cited

UNITED STATES PATENTS

| | | | |
|---|---|---|---|
| 3,517,432 | 6/1970 | Sandstrom | 29/472.9 X |
| 3,766,634 | 10/1973 | Babcock et al. | 29/472.9 X |

FOREIGN PATENTS OR APPLICATIONS

| | | | |
|---|---|---|---|
| 761,045 | 11/1956 | United Kingdom | 29/472.9 |

*Primary Examiner*—Carl E. Hall
*Attorney, Agent, or Firm*—Daniel R. Levinson; Joseph T. Cohen; Jerome C. Squillaro

[57] ABSTRACT

An improved method of bonding metal to a ceramic is described in which the metal is shaped, surface treated, and curved prior to heating the metal to form a eutectic bond between the metal and the ceramic. The surface treatment comprises heating the metal in a reactive atmosphere, e.g., in an oxidizing atmosphere to produce an oxide layer. The surface treatment is carried out at a temperature lower than the metal-metal oxide eutectic temperature.

9 Claims, 7 Drawing Figures

METHOD FOR BONDING METAL TO CERAMIC

This application relates to methods of bonding a metal to a ceramic and, in particular, to an improved method for bonding a metal to a ceramic utilizing a eutectic melt of the metal.

This application relates to copending application Ser. No. 336,043, filed June 1, 1973, which is a division of U.S. Pat. No. 3,766,634, both of which are assigned to the assignee of the present invention.

In U.S. Pat. No. 3,766,634, the entire disclosure of which is herewith incorporated by reference, there is described a method of bonding in which a metal and a ceramic are heated in a reactive atmosphere to produce a eutectic melting of the metal which, upon cooling, forms a tenacious bond between the metal and the ceramic.

While providing a strong bond between the metal and the ceramic, the method described above is difficult to perform selectively, i.e., over only portions of the metal, which would increase the versatility of the bonding method. Also, while the above method has a good yield rate, it is desirable to improve the yield still further. At the same time, it is desired to retain the inherent ease with which the bond is formed.

In view of the foregoing, it is therefore an object of the present invention to provide an improved method for bonding metal to ceramic.

Another object of the present invention is to provide a method of bonding metal to ceramic with improved uniformity, and yield.

In accordance with the present invention, the metal to be bonded is heated in a reactive atmosphere to produce a coating on the metal, the coating and metal forming the eutectic in a subsequent firing with the ceramic. The coating is then selectively removed or patterned as desired. The metal is then curved slightly and assembled with the ceramic, with the coating in between, and heated in a reactive, but less reactive than the first, atmosphere. The second heating is to the eutectic temperature of the metal and coating, i.e., slightly below the melting point of the metal. The eutectic wets the ceramic and, upon cooling forms a tenacious bond between the ceramic and the metal.

In the above-noted copending application and issued patent, several examples are given of suitable metals, reactive atmospheres, and substrates which are suitable for use in the present invention. For the description of the present invention, specific reference is made to copper, an oxygen bearing atmosphere, and alumina. It is understood that this is a specific example only and should not be construed as limiting.

Figure 1:
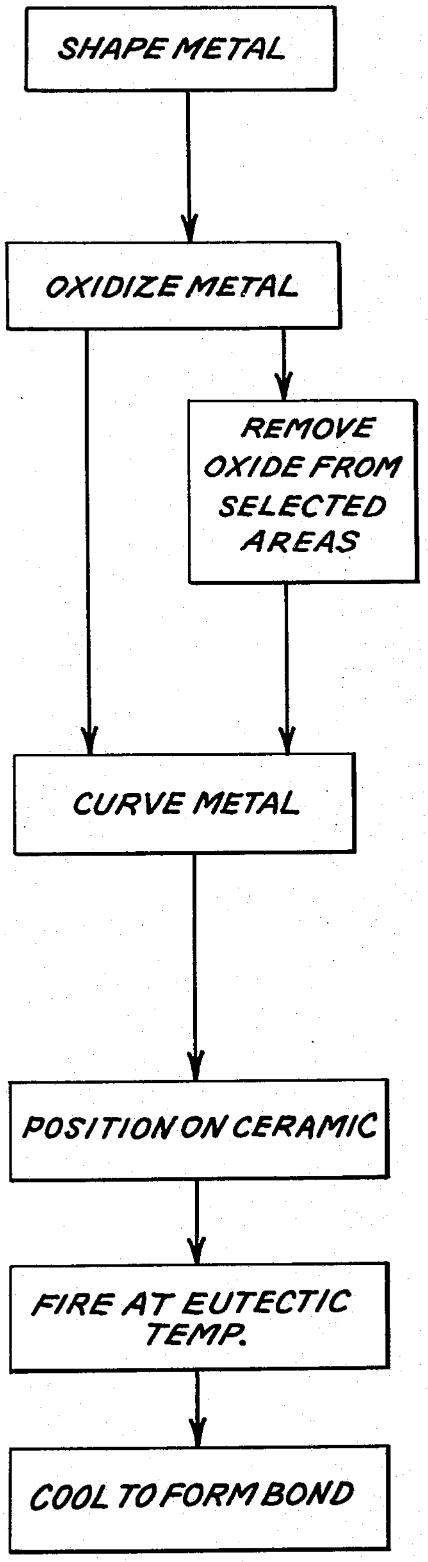

A more complete understanding of the present invention can be obtained by considering the following detailed description in conjunction with the accompanying drawings, in which:

FIG. 1 is a flow chart of the steps taken in carrying out the present invention.

FIGS. 2*a–f* illustrate the resulting structure from each step in the present invention.

The improved method for making bonds between a metallic member and a ceramic substrate may best be understood by considering FIGS. 1 and 2*a–f* together, in which copper sheet 21 is patterned as desired, depending upon application. It is understood that, for some applications, it may be desirable to pattern the copper after it is bonded to the ceramic rather than as the initial step. For example, the desired pattern for semiconductor applications of the present invention may result in a metallic member too delicate for ease of handling. Where the pattern does not result in too frail a member, it can be done as an initial step.

Copper sheet 21 is surface treated to produce a layer with which the copper forms a eutectic. Specifically, sheet 21 is placed in a suitable oven or furnace having an oxygen bearing atmosphere which, at an elevated temperature, produces an oxide layer 22 on the surface of the copper. It is to be noted that the oxidation of copper sheet 21 is not carried out at a sufficiently high temperature to produce a eutectic melting of the copper and copper oxide. Further, as may be visualized from FIG. 2*b*, the oxide may form on one or both sides of copper sheet 21, depending upon how sheet 21 is held in the furnace, i.e., whether or not the reactive atmosphere has access to both sides of the copper sheet.

A portion of oxide layer 22 may be removed from selected areas to produce a patterned oxide layer 22'. By utilizing a patterned oxide layer, one can selectively control the area at which bonding will occur between the copper and the ceramic substrate.

Figure 2A:
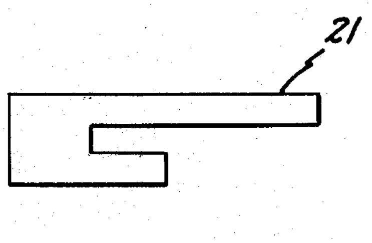
Figure 2B:
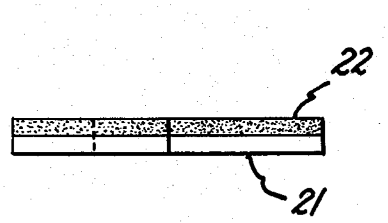
Figure 2C:
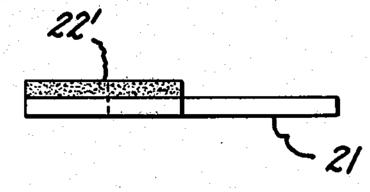
Figure 2D:
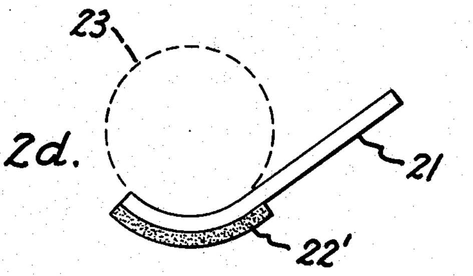
Figure 2E:
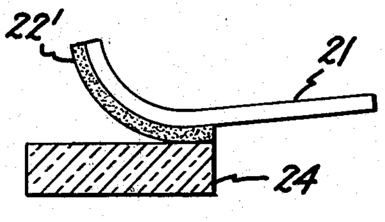

Copper sheet 21 is then curved or bent on a mandrel or other suitable device so that patterned oxide layer 22' is on the convex surface. The degree of curvature is not critical and depends in part upon the stability of the resulting article, i.e., whether or not the article will remain in place on a substrate, and also depends in part upon the size of the furnace opening through which the parts must pass. All of sheet 21 may be curved, or only the oxidized portions of the sheet may be curved, as illustrated in FIGS. 2*d* and 2*e*.

Copper sheet 21 is positioned as desired on the ceramic substrate 24 and the assembly is placed in a suitable furnace and fired at a temperature above the eutectic temperature of the copper and copper oxide, but below the melting point of the copper; i.e., between 1,065°C. and 1,083°C. As can be visualized from FIG. 2, curved copper sheet 21 is in contact with substrate 24 over a relatively small area at the beginning of the firing above the eutectic temperature. As the temperature of sheet 21 increases, it becomes more ductile and softens so that during the firing copper sheet 21 unrolls and conforms to ceramic substrate 24 in such a manner as to substantially reduce the formation of any possible voids or bubbles in the eutectic. The eutectic thus formed makes an intimate contact between copper sheet 21 and substrate 24, which, upon cooling, forms a bond 25 only in the desired areas and substantially free of defects. The atmosphere for the second firing comprises the same constituents as for the first firing, but need not be in the same proportion, i.e., the atmosphere is reactive, but not as reactive as the first time. The atmosphere in the second firing is not to oxidize the copper, but to assure that the oxidized copper is not reduced. The range of 0.01–0.50 percent by volume reactive gas is suitable.

As a specific example of the present invention, a 5 mil thick copper sheet, 1 inch by 1 inch, is passed through a conveyor furnace at 1,050°C. in a reactive atmosphere comprising approximately 0.4 percent oxygen in nitrogen to produce an oxide layer. The sheet is curved on a 2 inch diameter cylinder, oxide side out, so that the oxidized surface is convex. The sheet, oxide side down, is placed on alumina substrate and run through the conveyor furnace again at approximately 1,078°C. to form a eutectic melt of the copper and copper oxide, and to complete the bond. The oxygen concentration in the eutectic firing was reduced to 0.3 percent. The total time in the conveyor furnace, including warming and cooling, is approximately 10 minutes.

The bonding method of the present invention thus increases the yield of the bonded elements by reducing the number of voids or bubbles formed in the areas to be bonded. Further, reacting the metal prior to the eutectic melting step forms a layer which may then be suitably shaped to control the areas in which bonding takes place. In addition, the pre-eutectic reaction of the metal in the reactive atmosphere insures that an adequate layer of oxide is formed for the eutectic. If, for example, copper sheet 21 were simply overlying substrate 24, the reactive atmosphere must penetrate therebetween in order to form the eutectic bond. By first surface treating the copper, this requirement is eliminated. Further, copper sheet 21 can be thinner than previously used since most of the eutectic formation occurs at the interface between sheet 21 and substrate 24, rather than on the top surface of sheet 21.

Figure 2F:
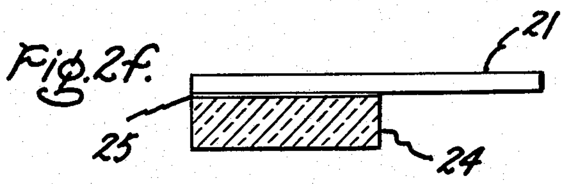

As illustrated in FIGS. 2*e* and 2*f*, copper sheet 21 overhangs substrate 24, forming an electrode for example. In processing, this electrode is supported in a jig having a boron nitride or carbon coating, to which the eutectic, if any, will not bond. Thus, the electrodes are kept straight during fabrication. Those portions of sheet 21 not oxidized and overlying substrate 24 are supported by the substrate but are not bound thereto.

In view of the foregoing it will be apparent to those of skill in the art that various modifications can be made within the spirit and scope of the present invention. For example, as previously noted, while the present invention is described in conjunction with a copper-copper oxide eutectic, the various combinations of metallic members and reactive atmospheres as set forth in the above-identified application and patent may be utilized in the present invention. Further, while described in conjunction with a conveyor furnace, which is preferred, any suitable furnace may be utilized. Also, other methods of forming the reacted metal layer may be utilized; for example, anodization or chemical reaction.

What we claim as new and desire to secure by Letters Patent of the United States is:

1. The method of bonding a metallic member to a ceramic substrate comprising the steps of:

heating the metallic member to a temperature below the eutectic temperature of the metal in a reactive atmosphere to form a layer of reacted metal on said member;

curving said member so that said layer is on the convex surface of said member;

placing said member in contact with said ceramic substrate;

heating said member and said substrate to a temperature above the eutectic temperature of the metal and said layer, and below the melting point of the metal, to provide a eutectic of said metal and said layer, said metal softening so as to unroll and to conform to the surface of said substrate in such a manner as to substantially reduce the possibility of the formation of any voids or bubbles in said eutectic as said eutectic wets the area of contact between said member and said substrate; and cooling said member and substrate to bond one to the other.

2. The method of claim 1 wherein said metallic member comprises copper and said reactive atmosphere includes oxygen.

3. The method of claim 2 wherein said reactive atmosphere comprises approximately 0.01–0.50 percent oxygen, balance nitrogen.

4. The method of claim 1 further including the step of:

removing said layer from selected areas of said metallic member prior to said curving step.

5. The method of claim 1 further including the step of patterning said metal member.

6. The method of claim 1 wherein said member and said substrate are heated in a reactive atmosphere that is less reactive than used for said metallic member alone.

7. The method of claim 6 wherein the said metallic member is heated in an atmosphere comprising 0.4 percent oxygen and said member and substrate are heated in an atmosphere comprising 0.3 percent oxygen.

8. The method of claim 7 wherein said metallic member comprises copper.

9. The method of bonding a metallic member to a ceramic substrate comprising the steps of:

treating at least one surface of said metallic member so as to form an oxide of said metal thereon;

curving said metallic member;

assembling said metallic member and said ceramic substrate with the treated surface in contact with said substrate;

heating said assembly to a temperature above the eutectic temperature of said metal and metal oxide and below the melting point of said metal to provide a eutectic of said metal and said oxide and to wet said ceramic substrate with said eutectic as said member unrolls from its curved shape so as to substantially reduce the possibility of the formation of any voids or bubbles in said eutectic; and cooling said assembly to bond the metallic member to said substrate.

* * * * *